United States Patent [19]
White

[11] 3,747,762
[45] July 24, 1973

[54] REVERSE FLOW AQUARIUM FILTER DEVICE

[75] Inventor: Eugene B. White, Oak Park, Ill.

[73] Assignee: Filters International, Inc., Chicago, Ill.

[22] Filed: May 10, 1971

[21] Appl. No.: 141,828

Related U.S. Application Data

[60] Continuation-in-part of Ser. No. 67,649, July 31, 1970, abandoned, which is a division of Ser. No. 805,274, March 7, 1969, Pat. No. 3,578,169.

[52] U.S. Cl. .............................. 210/169, 210/282
[51] Int. Cl. ......................... E04h 3/20, B01d 27/02
[58] Field of Search ................. 210/169, 500, 510, 210/282

[56] References Cited
UNITED STATES PATENTS

| | | | |
|---|---|---|---|
| 2,652,151 | 9/1953 | Legus | 210/473 |
| 3,525,435 | 8/1970 | Conner, Jr. | 210/169 |
| 3,540,591 | 11/1970 | Yamazaki | 210/169 |
| 2,961,710 | 11/1960 | Stark | 210/500 |
| R26,709 | 11/1969 | Linden et al. | 210/500 |
| 3,511,376 | 5/1970 | Seshultz | 210/169 |
| 3,483,985 | 12/1969 | Axerrod | 210/169 |
| 3,578,169 | 5/1971 | White | 210/169 |

*Primary Examiner*—Samih N. Zaharna
*Assistant Examiner*—T. A. Granger
*Attorney*—Hill, Sherman, Meroni, Gross & Simpson

[57] ABSTRACT

A filter structure for use in a aquarium water purification system, particularly as a tertiary filter in a system utilizing a shallow gravel trickling filter with underwater aeration and sedimentation followed by anaerobic action and final tertiary cycle.

5 Claims, 15 Drawing Figures

PATENTED JUL 24 1973

INVENTOR.
EUGENE B. WHITE

REVERSE FLOW AQUARIUM FILTER DEVICE

BACKGROUND OF THE INVENTION

This application is a continuation-in-part of application Ser. No. 67,649, filed July 31, 1970 now abandoned, which is a division of application Ser. NO. 805,274, filed Mar. 7, 1969, now U.S. Pat. No. 3,578,169.

The invention is directed to a water purification system for aquariums and the like. In the past, simple filter structures utilizing charcoal or the like have been employed in small aquariums, for example, from 5 to 40 gallons capacity, such filters usually employing a case in which bulk materials were placed, with the filter structure being disposed in the aquarium and the water circulated through the filter by means of a small air pump operative to simultaneously provide some aeration of the water. Filters of this type usually employed a charcoal in the form of relatively large or coarse pieces, which were placed in the filter with a layer of glass, wool or the like which formed a screen-like structure, which was relatively fine compared with the charcoal and was operative to trap particles of debris in the water being circulated. Filters of this type have a relatively short filtering cycle, tending to rather quickly slime up, and to replace the filtering materials it was necessary to remove the filter structure from the tank, clean such structure and repack it with bulk materials, an operation that was messy and disagreeable. In addition, relatively poor filtering action was achieved which was obvious from an inspection of the aquarium. At the same time, the debris or organic matter settled at the bottom of the tank, tending to fill the interstices in the usual aquarium gravel placed on the floor of the tank. In order to improve this condition, it was common practice to also maintain one or more scavenger fish in the aquarium which would live off of such matter and tend to reduce quantities thereof within the aquarium. In an effort to improve aquarium conditions so-called under-gravel systems have been proposed in which the aquarium gravel is not placed upon the floor or bed of the tank, but upon a shallow tray disposed on the tank bottom whereby the layer of gravel is elevated to provide a water chamber therebelow from which so-called filtered water was withdrawn and returned to the aquarium water. This type of arrangement was normally employed without additional filter means, of if an additional water treatment was desired, a small additional charcoal unit was disposed in the water on the end of the discharge line from the actuating pump. However, the usual aquarium gravel was ineffective to provide any effective filtration action and while efforts were made to provide a simple structure to provide a water flow throughout the area of the gravel bed, the structures employed were ineffective to achieve the desired operation with the result that merely localized flow through the gravel adjacent the pump took place with a settling and an accumulation of organic material and other debris in the gravel, which could readily be ascertained by merely agitating the tank water adjacent the bottom of the tank which would result in a murky cloud of debris.

One form of tray structure is illustrated in U.S. Pat. No. 2,935,199 granted on May 3, 1960 to Allan H. Willinger, while a filter which may be employed therewith is illustrated in U.S. Pat. No. 3,145,168 granted on Aug. 18, 1964 to Victor E. Scafuro. The present invention is directed to a purification or filter system and filter structure which eliminates the disadvantages of the prior devices.

SUMMARY OF THE INVENTION

The invention is directed to a water purification system employing an under-gravel trickling filter, utilizing a tray structure somewhat similar to the heretofore employed but adapted to contain a shallow bed of filter material upon which the usual aquarium gravel may be placed, with the tray structure being so constructed that a relatively uniform water flow through the filter bed is achieved.

Two examples of filter constructions are presented, one of which is of the external type adapted to be disposed exteriorly of the aquarium water, as for example, supported on one wall edge of the tank, and the other example being an internal type adapted to be disposed directly in the tank water. For very small tanks, the internal embodiment may be employed without the additional under-gravel trickling filter. The arrangement is such, irrespective of the particular type of filter employed, that bio-filtration is achieved with a continuous circulation of settled debris at a high rate through the shallow filter bed for biological oxidation and final water polish through the external or internal filter structure, thus resulting in a tertiary cycle. The primary cycle thus results from the sedimentation and aeration taking place in the shallow under-gravel filter with the water flow therethrough, having been aerated by the same air pump which produced the water circulation. The oxygen content oxidizes the organic matter present which is drawn through the aquarium gravel and oxidized at the interface between the latter and the layer of filter material therebelow. At the same time the anaerobic action in the filter bed absorbs organic compounds and decomposes them to gases, a characteristic of an underwater gravel filter of this type being the natural unloading of the humus-like film which accumulates in the filter bed, thus preventing clogging of the under-gravel filter with colloidal and suspended matter plus portions of the soluble organic substances concentrate at the trickling filter interface where such absorbed substances are attacked by enzymes and bacteria, and ammonia thus liberated is subsequently oxidized.

The stabilized effluent of the tricling filter then flows through the under drainage system provided to the final filtering system which effects the final clarification and purification of the water prior to its discharge back into the tank. In the external construction the eductor pump is disposed between the under drainage system and the external filter structure, while in the internal construction the pump is disposed at the discharge side of the internal filter system whereby it draws the water from the underwater drainage system through the filter from which it is discharged through the pump back to the tank.

In the preferred embodiment of the underwater drainage system, the tray structure is constructed in two sections, one of which forms the supporting surface for the shallow layer of filter material, upon which the aquarium gravel is disposed. The other section forms a supporting structure for the first and at the same time is constructed to provide a substantially uniform water flow through the filter material throughout the area of the filter bed.

The external filter structure, in addition to its advantage of accessibility for maintenance, also provides the advantage of utilizing the natural flow of the water to provide the pressure head through such filter and is so constructed that in the event the filter becomes clogged the water flow by-passes such filter, returning the water to the tank whereby the undergravel filter can be retained in operation.

The present invention therefore has among its objects the production of a filter system which is simple in construction, relatively inexpensive and yet will provide superior filtering efficiency.

Another object of the invention is the production of such a filter system which makes use of both anaerobic and aerobic action.

A further object of the invention is the production of a filter structure, either of the external or internal type, in which the filtering materials may be permanently disposed in a removable and replaceable cartridge, whereby replacement of the filter material may be readily and very simply accomplished, merely by removing the old cartridge and substituting a new one therefore, completely eliminating any messy replacement operation.

Another object of the invention is the production of a shallow under-gravel trickling filter arrangement which is exceedingly simple but yet efficiently supports the filtering material in a graduated or tapered bed, together with means cooperable therewith for providing a balanced water flow through the filter bed, thereby promoting effective filtering action and at the same time efficient water circulation throughout all parts of the acqarium.

Many other objects and advantages of the present invention will be obvious to those skilled in the art from a disclosure herein given.

BRIEF DESCRIPTION OF THE DRAWINGS

In the drawings wherein like reference characters indicate like or corresponding parts.

DETAILED DESCRIPTION OF THE INVENTION

For clarity the description will be presented in four parts. The first being general and briefly covering the basic components; the second being detailed description of the under-gravel filter; the third including details of the external filter strucutre; and, the fourth including details of the internal filter structure which may be designed for utilization with or without the under-gravel filter.

GENERAL CONSTRUCTION

Figure 1:
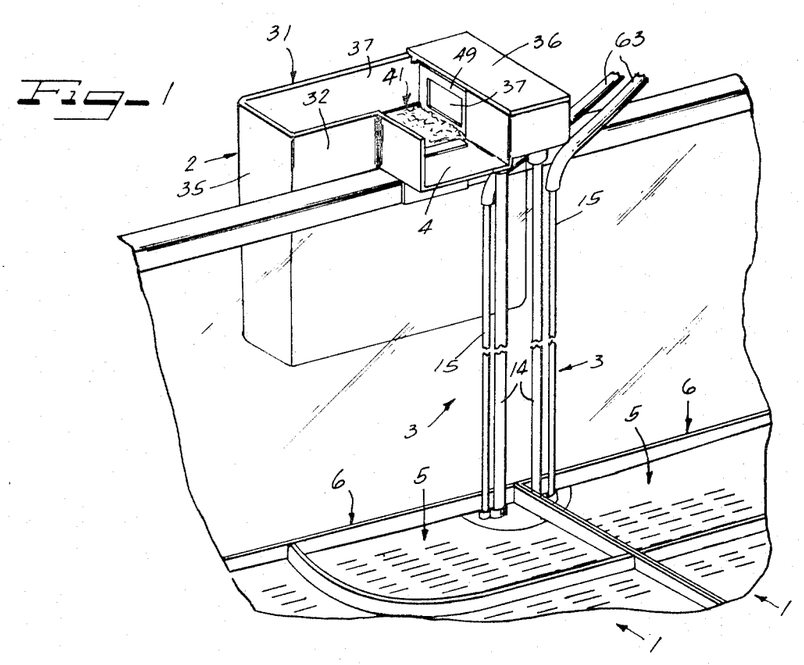
FIG. 1 is a perspective view of a part of the rear portion of an aquarium, illustrating an external type filter mounted on the upper edge thereof and a portion of the tray structure for the under-gravel trickling filter and underwater drainage system.

Referring to FIG. 1, the reference numeral 1 indicates generally an under-gravel tray structure adapted to be placed on the bottom of the aquarium tank A and cooperable with an external filter structure, indicated generally by the numeral 2, two such tray structures being illustrated, disposed in abutting relation and each connected with the filter structure 2 by an eductor pump assembly indicated generally by the numeral 3, one pump structure being provided for each of the trays.

As will hereinafter be described in grater detail, each tray structure is adapted to form the supporting member for a layer of filter material such as particles of anthracite or quartz, which, if desired, may be suitably activated with purification materials in a known manner, upon which layer the usual aquarium gravel is to be disposed. Aquarium water, after passing through the gravel and the filter material, is drawn from the bottom side of the tray 1 by means of the pump 3 into the filter structure 2 in which it is further filtered and returned to the tank through a discharge spout 4.

Where an internal filter structure is employed the pump may be constructed as a part thereof and the entire assembly disposed within the tank with the water inlet structure being constructed for cooperation with an under-gravel filter or constructed to receive water directly from the tank adjacent the bottom thereof.

The Under-gravel Filter

Figure 2:
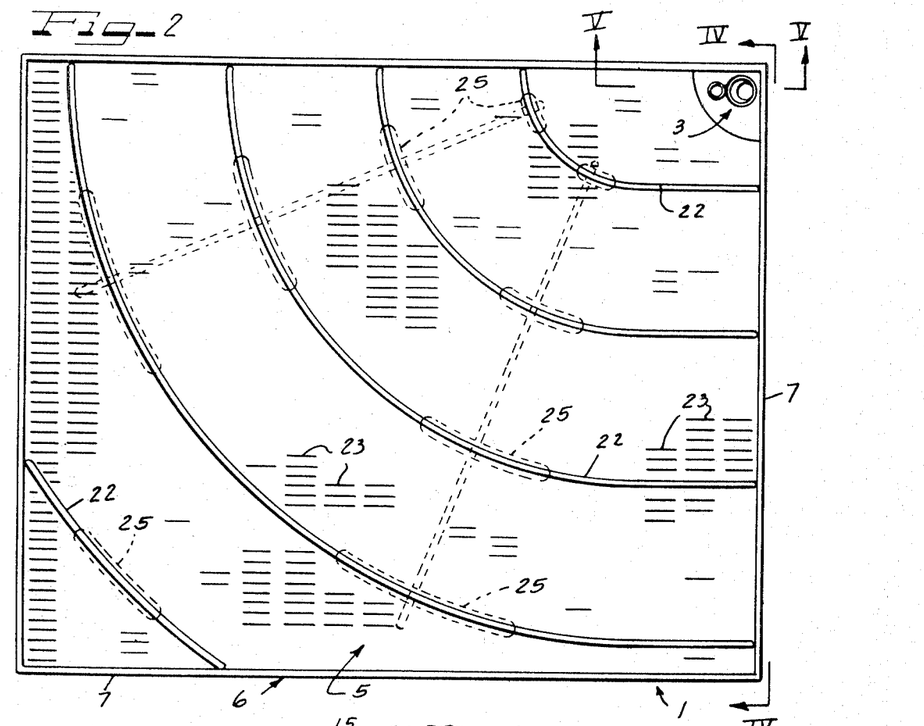
FIG. 2 is a top plan view of the supporting tray for the filter material of the under-gravel tray structure.
Figure 3:
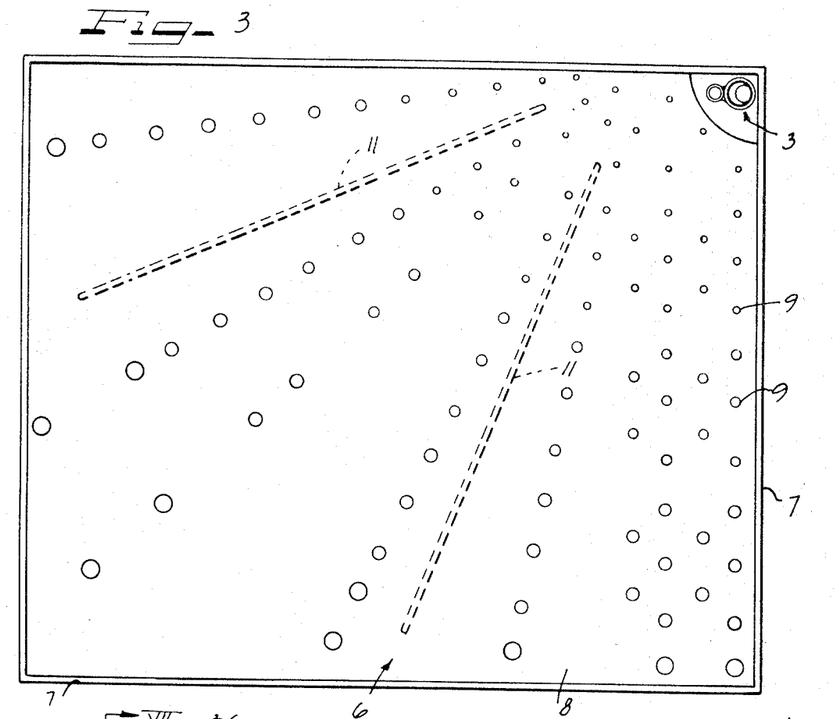
FIG. 3 is a bottom view of the under-gravel tray structure.
Figures 4, 5:
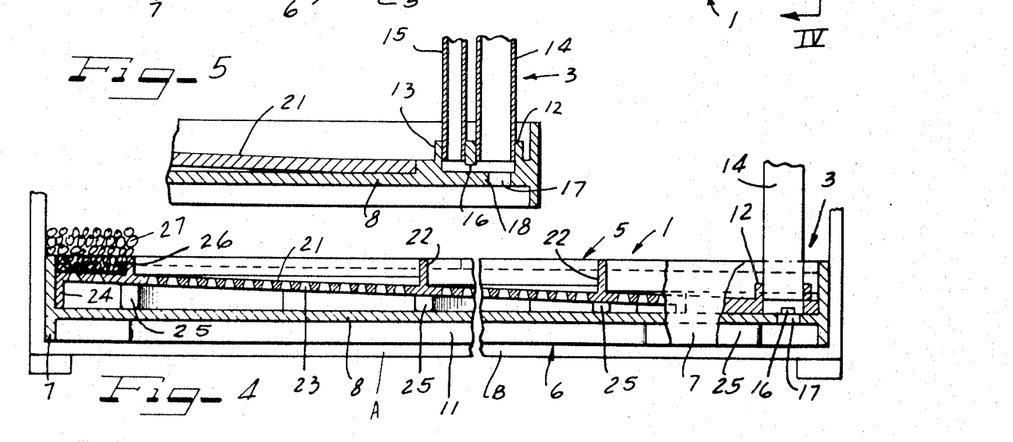
FIG. 4 is a sectional view taken approximately on the line IV—IV of FIG. 2.
FIG. 5 is a sectional view taken approximately on the line V—V of FIG. 2.

Referring to FIGS. 2 through 5, the under-gravel filter structure 1 is constructed in the form of a tray having an upper section 5 and a lower section 6. The lower section 6 comprises peripheral walls 7 between which extends a horizontal wall or floor 8, the latter being provided with a plurality of apertures or openings 9 therein as illustrated in FIB. 3, in which only a part of the openings 9 are illustrated merely to indicate the proportioning thereof. The openings adjacent the right hand peripheral wall 7 are illustrative of the general spacing in proportioning throughout the wall 8, and as is illustrated in FIG. 3 in dotted lines the lower section 6 is provided with a plurality of ribs 11 which are provided merely to give support to the central portion of the floor 8. The upper righthand corner of the tray section 6, as viewed in FIGS. 2 and 3 carries the base structure of the pump 3 which, as illustrated in FIG. 5, is provided with tubular extensions 12 and 13 forming receiving bores for the pump discharge tube 14 and the air inlet tube 15, the latter being operatively connected at their lower ends by an air discharge port 16. Also communicating with the lower end of the discharge tube 14 is a bore 17 located in the floor 8.

To facilitate fabrication of this structure, the portions 12 and 13 may be formed as a separate piece which is suitably cemented or otherwise secured to the floor 8 to provide a finished construction as illustrated in FIG. 5. As will be apparent from a reference to FIG. 4, the air discharge port 16 is generally rectangular in transverse cross-section and has an area which is less than that of the tube 15 whereby air discharged into the lower end of the water discharge tube 14 has an increased velocity. In operation, air is discharged from the bottom of the tube 15 through the port 16 and flows upwardly through the tube 14 drawing water from below the floor 8 through the opening 17, providing a very efficient pumping action with which is increased in the present construction by the provision of a shoulder or extension 18 which extends laterally below the tube 14 and eliminates any tendency of air discharged from the port 16 to pass downwardly through the opening 17. In the embodiment illustrated, the shoulder 18 is formed by employing an offset of eccentric bore 17 having a diameter which is less than that of the tube 14.

The upper tray section 5 is provided with an inclined floor 21 which slopes toward the pump 3 whereby the highest portion of the floor is adjacent the lower left hand corner, as viewed in FIG. 2. Extending upwardly from the floor 21 are a plurality of partition ribs 22, the top edges of which are disposed substantially in the plane of the top edges of the peripheral walls 7 of the lower section with each partition rib extending along a portion of the floor which is uniformly spaced from the floor 8 of the lower section. As will be apparent from FIGS. 2 and 4, the floor 21 is provided with a plurality of slots 23 therein which extend horizontally, as viewed in FIG. 2, and are arranged in columns which extend entirely across the face of the section (only a portion of the slots being illustrated in FIG. 2). As shown in FIG. 4 the slots 23 have downwardly diverging side walls whereby the width of each slot is less adjacent the upper face of the floor 21 than adjacent the bottom face thereof, with the width of the slots in their narrow direction being less than the smallest particle size of filter material which is to be supported thereby.

The upper section 5 preferably is provided with a peripheral supporting wall 24 and a plurality of intermediate ribs 25 which, in the embodiment illustrated, are disposed directly below corresponding ribs 22 as will be apparent from a reference to FIG. 2. In the particular embodiment illustrated, the ribs 11 of the lower section and the ribs 25 of the upper section have no operational function but are operative merely to provide adequate support for the floors 8 and 21 respectively.

As illustrated in FIG. 4 filter material 26 is adapted to be disposed directly upon the floor 21 with the upper surface of the filter material being substantially flush with the upper edges of the peripheral walls 7 and ribs 22, with a layer of aquarium gravel 27 being disposed thereupon and covering the bed of filter material as well as any other exposed portions of the tray structure 1.

In operation, water may pass through the layer of gravel 27, through the layer of material 26 of the trickling filter passing through the slot 23 and openings 9 in the floor 8, into the chamber formed by the bottom 28 of the aquarium A and the lower portion of the section 6, from which the water may be drawn by the pump 3 through the opening 17 and discharged from the tube 14.

The External Filter

Referring to FIGS. 1, 6, 7 and 8, the external filter structure comprises a hollow body structure or casing, indicated generally by the numeral 31, having a front wall 32, a rear wall 33, a bottom wall 34 and end walls 35 with the upper side of the casing being open and adapted to be partially closed by a removable cover member 36.

Figure 6:
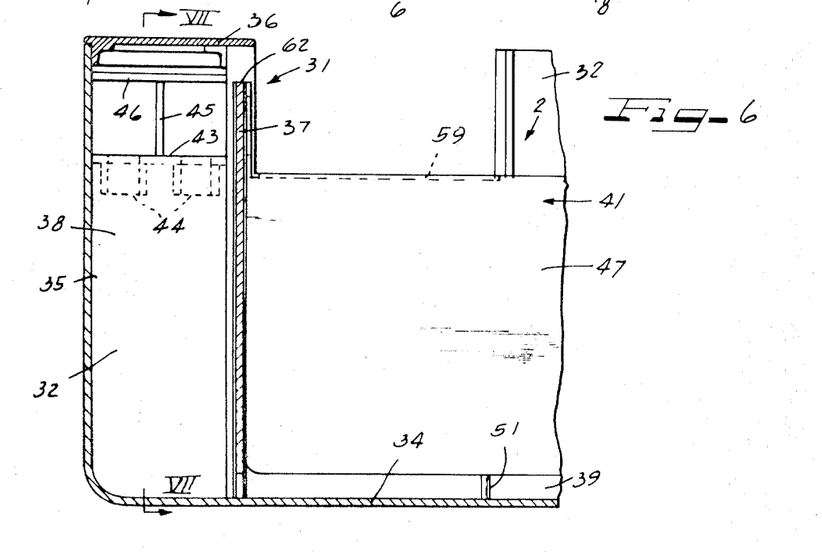
FIG. 6 is a longitudinal sectional view through the external filter structure, taken approximately on the line VI—VI of FIG. 7, with the filter cartridge being illustrated in elevation.
Figure 7:
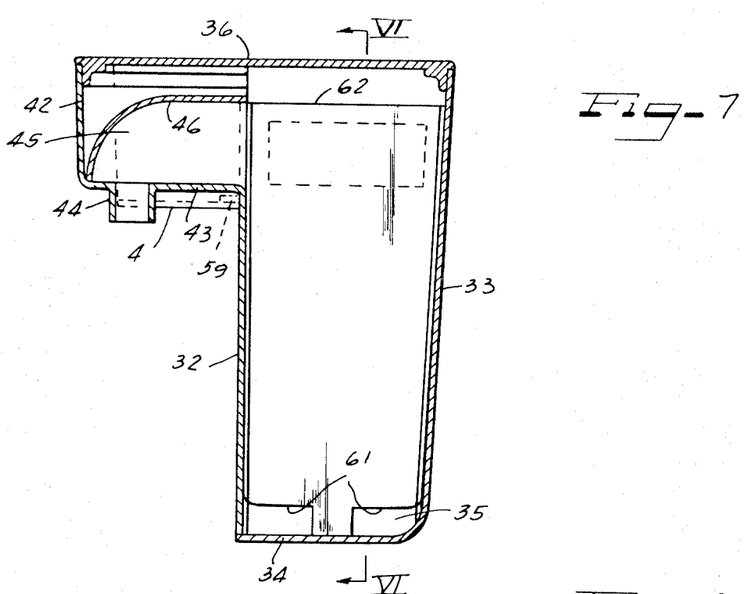
FIG. 7 is a transverse sectional view, taken approximately on the line VII—VII of FIG. 6.
Figure 8:
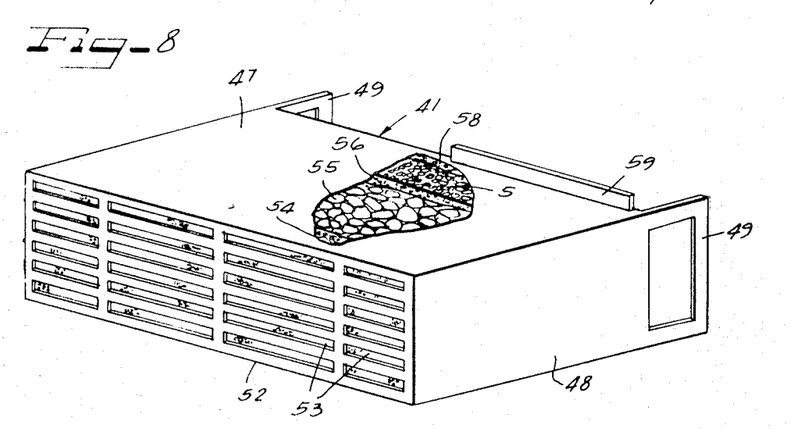
FIG. 8 is a perspective view of the filter cartridge employed with the external filter illustrated in FIGS. 1, 6 and 7.

As illustrated in FIGS. 6 and 7, the interior of the casing 31 is divided by a partition wall 37 into a water inlet chamber 38 and a water filtering chamber 39 in which is disposed a filter cartridge 41, illustrated in FIG. 8. The body 31 is also provided with a forwardly disposed portion 42 over which the cover 36 extends, and which has a bottom wall 43 provided with two downwardly extending tubular water inlet fittings 44 which are adapted to receive the upper ends of a pair of pump tubes 14, assuming two pumps are employed as illustrated in FIG. 1. If the filter structure is utilized with only a single pump, the unused member 44 may be suitably closed with a rubber plug or the like. The portion 42 is laterally divided by a partition wall 45 disposed intermediate the two inlet fittings 44 with the upper edge of the engaging partition wall and secured to a water directing or splash member 46, whereby water discharged into the structure is directed into the water-receiving chamber 38.

As illustrated in FIG. 8, the filter cartridge 41 is constructed of plastic or other suitable material and is of generally rectangular shape having side walls 47 and end walls 48 of such lateral dimensions that they are generally complemental to the adjacent side and end walls of the water-filtering chamber 39. In the embodiment illustrated, the end walls 48 are extended upwardly to form handles 49 by means of which the cartridge may be inserted or removed from the body 1, with the inserted cartridge being adapted to rest on a plurality of projections or abutments 51, only one of which is illustrated, which extend inwardly from the respective walls 32, 33 and 35 which cooperate with the partition wall 37 to define the chamber 39.

As illustrated, the bottom 52 of the cartridge 41 is provided with a plurality of slots 53 therein through which water may flow into the cartridge, and disposed in the cartridge adjacent the bottom thereof is a layer of suitable material as for example a porous foam plastic 54 which forms a retaining member for relatively large particles of filter material 55 disposed in the cartridge. Covering the exposed face of the layer of filter material 55 is a screen 56, which may be constructed of perforated plastic or other material and is adapted to separate a layer of relatively small particles of filter material 57 from the material 55 with the adjacent open side (the upper side as viewed in FIG. 1) of the cartridge being covered with a layer of porous foam plastic material 58, which may be of the same material as the layer 54 which is suitably secured to the side walls of the cartridge. As the pores of the material 58 are smaller in size than the particle size of the material 57, the filter material is effectively retained in operative position in the cartridge. The cartridge is also provided with a laterally extending lip 59 which overlies the adjacent face of the discharge spout 4 when the cartridge is in operative position.

The partition wall 37 functions as an inverted weir and is provided with openings 61 at the bottom thereof through which water may flow from the water inlet chamber 38 into the chamber 39 directly below the cartridge and thus may enter the openings 53 formed in the bottom of the cartridge. Referring to FIg. 6 it will be noted that the lip 59 and the discharge spout 7 are disposed below the upper face of the wall 43 with the difference in height therebetween representing the head of water exerting pressure on the water in the filter cartridge to provide a minimum pressure head at all times.

In the event the cartridge should become clogged and the flow therethrough fall below an amount sufficient to accommodate the in flow into the chamber 38, the water level in the latter will rise until it reaches the top of the partition wall 37 at which it may readily overflow into the chamber 39 and be discharged from the spout 7, the wall 37 thereby functioning also as a safety weir eliminating any possibility of overflow other than a return flow into the aquarium tank.

FIG. 1 illustrates the connection of two filter trays 1 to the external filter 2 by means of respective pumps 3, the air tubes 15 of which are adapted to be connected by flexible tubes 63 to air pumping means for supplying air to each of the pumps and in operation, each of the trays 1 would be filled with a layer of activated filter material functioning as an anerobic trickling filter which in turn is covered by a layer of aquarium gravel as partially illustrated in FIG. 4. With a tank full of water and air supplied to the respective pumps, discharge of air to the ports 16 of the respective pumps will result in an upward flow of water in each tube 14, which water is drawn from below the respective trays and discharged into the chamber 38 of the filter 2.

Due to the novel construction of each tray structure 1, water will be drawn substantially uniformly through the gravel bed and anaerobic trickling filter on the upper section, and as the openings 9 in the lower section function to meter the water from the various areas of the tray, the openings closest to the pump being the smallest and the openings gradually increasing in size as the distance increases from the pump whereby the reduced action of the pump at the more remote points is compensated by the larger openings. At the same time the tapered formation of the bed of filter material 26 provides additional compensation at the remote points on the tray thereby tending to balance the flow through the upper section and reducing the possibility of a short circuiting water flow concentration adjacent the pump. Upon discharge of the water into the chamber 38 a flow will take place through the openings 61 into the bottom of the filter cartridge 41 by way of the openings 55 therein, with the filtered water being discharged from the top of the cartridge and flowing over the discharge spout to return to the aquarium.

It will be noted that as the cartridge accumulates material therein, withdrawn from the water, as the flow through the tertiary filter cartridge diminishes, the increased resistance across the tertiary filter will result in a raising of the water level in the chamber 38 resulting in an increase in the head pressure on the filter, whereby the structure tends to be self-compensating, tending to maintain a relatively uniform filtering action.

In the event the tertiary filter reaches the point where the flow is substantially blocked the water level in the chamber 38 is free to rise to a point where it can overflow the top edge 62 of the wall 37 to by-pass the filter cartridge and discharge directly to the discharge spout 7 thereby eliminating any possibility of an overflow exteriorly of the tank.

Internal Filter Structure

As previously mentioned, the embodiment of the invention constructed for disposition within the aquarium tank may be employed with or without an under-gravel filter, such as the described in connection with the external filter structure, within the only difference being a slightly modification of the body or housing and corresponding changes in the water inlet openings. FIGS. 9–12 illustrate the general construction of the inter filter and the arrangement of the fluid inlets when used without an under-gravel filter structure while FIG. 13 illustrates the modifications therein when employed with such activating trickling filter.

Referring to FIGS. 9–12, in this embodiment of the invention the casing or body member 101 is designed to be positioned in a corner of the aquarium tank and thus is provided with two vertically extending walls 102, extending substantially at 90° to one another, which are connected to a diagonally extending front wall 103 by respective intermediate connecting walls 104. The walls 102, 103 and 104 are joined to a bottom wall 105 and the open upper end of the structure is closed by a cover member 106 having downwardly extending peripheral flange portion 107, with the configuration of the respective walls being such that the body member and cover form a truncated prism, with the cover 106 extending upwardly at an angle and forming an apex at the juncture of the walls 102. Disposed in the casing 101 are a pair of upwardly extending partition walls 108, which extend in parallel relation with respect to the walls 104, and disposed between walls 102, 103 and partition walls 108 is a filter cartridge, indicated generally by the numeral 109, which is provided with side walls 111, 112 and 113 extending in substantially parallel relation with respect to the corresponding walls 102, 103, and 108. The side walls of the cartridge are connected by a bottom wall 114 which is provided with a plurality of water inlet openings 115 therein.

The internal construction of the cartridge 109 is similar to the cartridge 41 with the main difference being that the flow through the cartridge 109 is in a reverse direction to that in the cartridge 41. In the latter the water flow is upwardly through the cartridge while in the cartridge 109 the flow is from the top downward through the bottom. As a result, the arrangement of the fine and coarse filter materials is reversed, the fine filter material 57 being disposed adjacent the bottom wall 115 and retained in position by a porous layer 58 of plastic foam or the like followed by a separating stril 56, a layer of coarse filter material 55 and a retaining porous layer 54 of foam plastic or the like.

In this construction the pump structure 3' is formed as a separate unit that is otherwise of the same general construction as that previously described, and comprises a base member 118, adapted to seat on the bottom 105 at the corner of the walls 102, with the base member 118 having respective bores of a size to receive the water-conducting tube 14' and the air tube 15'. The base member 118 is provided with an air-discharge port 16', a shoulder 18 and water inlet opening 17', the latter communicating with the water-receiving chamber 119 disposed below the bottom 105 of the cartridge.

As clearly illustrated in FIG. 11, to provide space for the pump 3' the walls 111 are connected at their converging edges by a semi-circular wall 121, which is cooperable with the intersecting portions of the walls 102 to form the space for the pump 3', with the latter having a pair of horizontal reinforcing members 122, each of which has a configuration which is substantially complemental to that formed by the walls 121 and adjacent portions of the walls 102, thereby effectively sealing such space with respace to the flow of water therethrough. The carriage 109 is supported on a pair of abutments or legs 123 which are disposed adjacent the bottom 105 and front wall 103, as clearly illustrated in FIGS. 10 and 11, with the rear portion of the cartridge being supported on a leg member 124 formed on the pump base 118. Thus as the pump 3' is not permanently mounted in the casing 101, by applying upward force to the pump structure it may be raised, carrying with it the cartridge 109, the pump in effect forming a handle facilitating removal and insertion of the cartridge.

Figure 10:
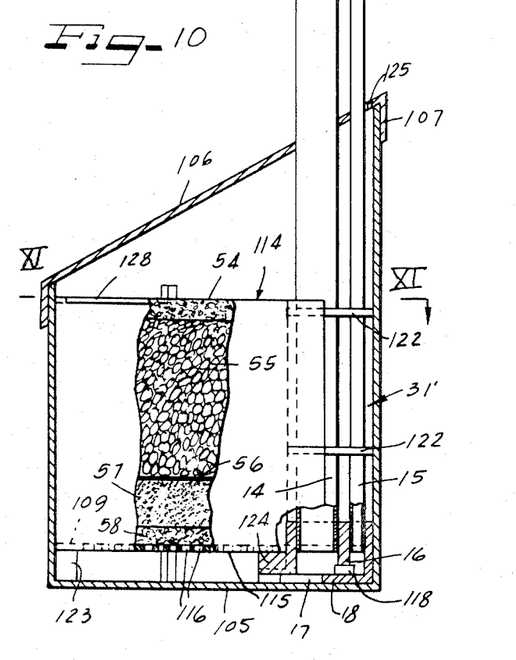
FIG. 10 is a section taken approximately on the line X—X of FIG. 11, with the major portion of the filter cartridge therefor being illustrated in elevation and a portion thereof broken away to show the details of construction thereof.
Figures 11, 13:
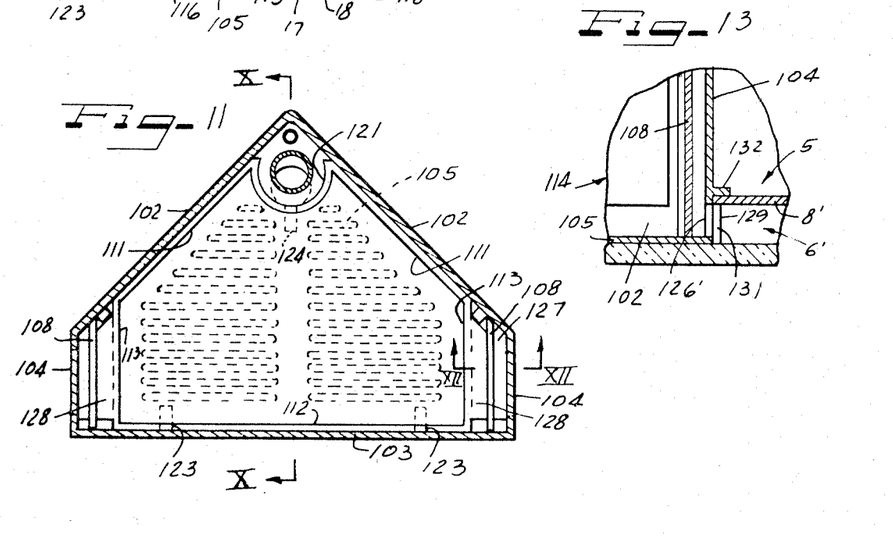
FIG. 11 is a transverse sectional view taken approximately on line XI—XI of FIG. 10.
FIG. 13 is a sectional view similar to FIG. 12 illustrating the construction of the filter illustrated in FIG. 9 where it is to be employed with an under-gravel trickling filter.

As illustrated in FIG. 10, the tubes 14' and 15' extend through cooperable openings in the cover member 106, which is provided with an additional, relatively small opening 125 adjacent the juncture of the cover member and the walls 102, whereby such opening is at the highest point of the casing interior and is adapted to permit an egress of air therethrough when the filter is initially immersed in an aquarium, thereby preventing the trapping of air within the upper portion of the filter.

Figure 9:
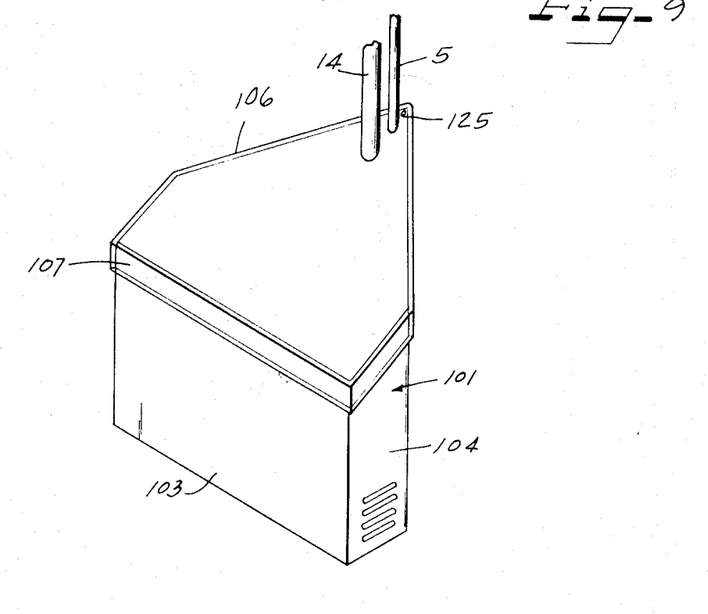
FIG. 9 is a perspective view of an internal filter embodying the invention.
Figure 12:
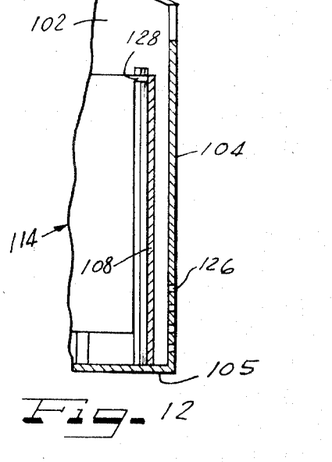
FIG. 12 is a vertical section taken approximately on the line XII—XII of FIG. 11.

As will be apparent from a reference to FIGS. 9 and 12, the filter therein illustrated, being designed for use without an under-gravel trickling filter, is provided with water inlet openings 126 in the side walls 104, adjacent the lower portion of the latter, whereby water is free to flow into the water inlet chambers 127 defined by the respective pairs of walls 104 and 108 and adjacent portions of the walls 102 and 103 with such water flowing upwardly over the weirs formed by the wall 108 to the top of the cartridge 109. The water may then flow downwardly through the cartridge to the chamber 119 therebelow defined by the casing bottom 105, cartridge bottom 109 and adjacent portions of the side walls 102, 103 and walls 108, from which the water is exhaused through the eductor pump 3', the water entering the opening 17' and flowing upwardly through the tube 14'. The upper end of the latter may terminate short of the surface of the tank water and thus is operative to directly return the filtered water to the tank.

In the embodiment illustrated in FIGS. 9-13, the casing interior is provided with ribs for supporting and reinforcing the walls 108 and to close the space between the walls 113 of the cartridge and adjacent walls 108, the cartridge may be provided with horizontally extending flanges or lips 127 which effectively seal the space between the walls 108 and the walls 113, thereby preventing a by-pass flow of water therethrough.

In operation of the internal filter structure, upon supply of air to the tube 15', such air will rise in the tube 14', resulting in an eductor action carrying a flow of water upwardly through the tube, which flow will in turn create a flow through the filter, with the water entering the inlets 126 passing upwardly in the respective chambers 127, down through the filter to the chamber 119 and into the pump 3'.

In the event an internal filter such as illustrated in FIGS. 9-11, is to be employed with an under-gravel trickling filter similar to that illustrated in FIGS. 1-6, the construction of the undergravel filter may be substantially as previously described with the exception of the construction of the corner portion at which the pump 3 is located.

In this case, as illustrated in FIG. 13, the lower section 6' of the tray structure 1' is provided with an opening therein of a size to receive the filter casing 101 with the tray section having a downwardly depending wall 129, which is disposed adjacent the periphery of the filter structure and is provided with an opening 131 therein located adjacent each of the walls 104 of the filter, with each of the latter walls having a single cooperable water inlet opening 126' aligned with the corresponding opening 131, the openings 126' each taking the place of the plurality of openings 126 in the respective walls 104 illustrated, for example, in FIGS. 9 and 12.

As illustrated in FIG. 13, the side walls 104 and 103 of the casing 101 may be provided with outwardly extending flanges 132 adapted to seat on the adjacent floor 8' of the lower tray section 6, with the upper tray section 5 terminating adjacent the flange 132 as clearly illustrated in FIG. 13.

In this construction the operation of the under-gravel filter would be substantially the same as that previously described in connection with the external filter structure with the finally filtered and polished water being discharged directly into the tank from the upper end of the tube 14'.

It will be noted that in both of the embodiments illustrated, the filter material is so disposed in the cartridge that the unfiltered water enters the end of the cartridge containing filter material having the greatest particle size, and after flowing through the latter is passed through the filter material of lesser size, which I have found contributes substantially to an exceptionally long filtering cycle without excessive clogging, etc.

It will be apparent that in replacing the filter cartridge of the internal filter the entire filter casing may be readily lifted up from the tank and upon removal of the cover, the cartridge may be readily withdrawn by raising the pump structure as previously described. Following insertion of a new cartridge and return of the cover, the filter casing may be readily returned to its original position in the corner of the tank.

It will be apparent that, while I have illustrated an internal filter structure having a generally triangular cross-section, that the present invention may be readily embodied in filter structures of different configuration as, for example, having a rectangular cross-section and a height greater than its other dimensions. Such as construction is particularly suitable where the filter is fabricated in a relatively small size adapted for use in tanks, for example, of around five gallons, etc., whereas in larger tanks it may be desirable to employ a correspondingly larger filter, in which case the triangular-shaped structure may appear less bulky in the tank than a large filter of rectangular construction.

It will be noted from the above description that where the complete system is employed the aquarium is, in effect, provided with a complete, self-contained sewage disposal system which will provide bio-filtration as previously described, resulting in crystal clear aquarium water, heretofore unobtainable in small aquariums. While I have illustrated the purification system and filter structures in embodiments suitable for small home aquariums and the like, it is believed obvious that the present invention is not limited to comparatively small aquariums and may be quite readily adapted to large aquarium tanks and the like, in which case the size of the filter elements would be proportionately increased and the tray structures, etc., suitably fabricated for use in the surrounding conditions to which it is to be subjected. For example, the tray structure for the under-gravel filter may be fabricated from metal or the like to provide adequate strength for the particular application.

Modified External Filter Structure

Figure 14:
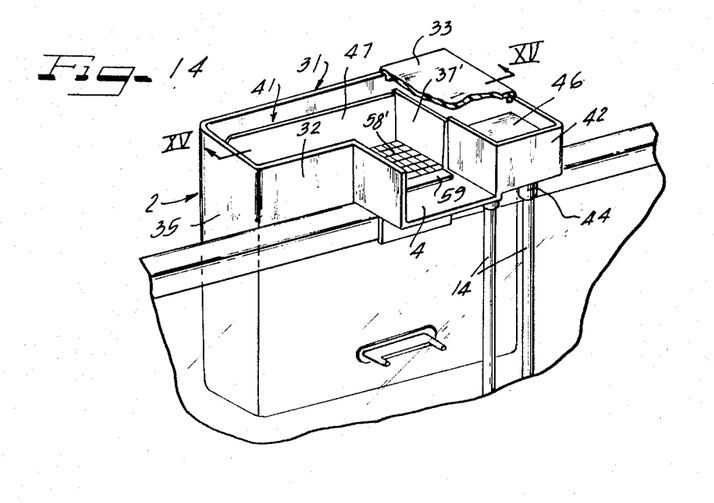
FIG. 14 is a perspective view, similar to FIG. 1, illustrating a modified construction of the external filter.
Figure 15:
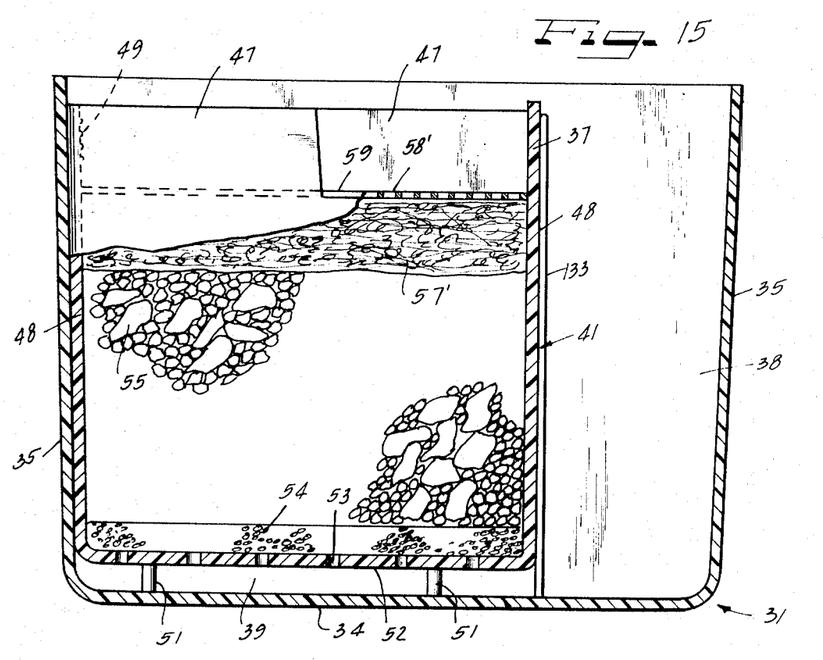
FIG. 15 is a sectional view taken approximately on the line XV—XV of FIG. 14.

FIGS. 14 and 15 illustrate a modified form of external filter construction in which the body structure or casing 31 is provided with a front wall 32, rear wall 33, bottom wall 34 and end wall 35 having a configuration similar to the construction illustrated in FIG. 1, and may be provided with a cover member such as the member 36 illustrated in FIG. 1, which if desired can extend completely across the top of the unit. The casing 31 is likewise provided with a forwardly disposed portion 42, of like construction to that previously described, having tubular inlet fittings 44 to which the upper ends of the pump tubes 14 are adapted to be connected and may be provided with the corresponding structure previously described including the splash member 46.

The cartridge, indicated generally by the numeral 41, likewise is of general construction similar to that illustrated in FIG. 8 and is provided with respective side walls 47 connected by end walls 48 and bottom wall 52, the latter having a plurality of suitably shaped openings 53 therein for the entry of water into the cartridge. As in the previous construction the cartridge is adapted to be supported by suitable means such as a plurality of legs or abutments 51 extending upwardly from the bottom wall 34. Likewise, disposed adjacent the bottom 52 is a layer 54 of suitable material as for example a plastic foam which forms a retainer for filter material indicated generally by the numeral 55, the layer 54 functioning as a water distributing structure whereby water flow is distributed substantially uniformly over the area of the filter material and at the same time forming a support for any particles of filter material that might be smaller than the opening 53 in the bottom wall 52.

In this construction the filter material 55 may for example consist of a mixture of activated expanded perlite and charcoal or carbon for the absorption of any residual contamination and material remaining in the water entering the filter structure.

Disposed above the filter material 55 is a layer 57 of suitable material as for example a mass of long polyester fibers which serves not only the function of providing a relatively fine filtering media but also functioning as an indicator to indicate by discoloration the fact that the cartridge has reached the end of its normal filtration period and should be replaced. The upper wall of the cartridge is formed, in this construction, by a perforated sheet of plastic 58 which has an extension forming the lip 59.

The upper portions of the end walls 48 of the cartridge, extending above the tope wall 59 in effect form handles 49 corresponding to the previously described construction with the upper portion of the wall 48 forming the weir 37 also serving the dual function of a handle.

It might further be mentioned that while the under-gravel filter and the final filter constructions herein illustrated, employing cartridge elements, are particularly adapted to use with the specific under-gravel filter illustrated, the latter could, for example, be employed with filter structures utilizing bulk filter materials with improved results over prior filter structures designed for comparable usage.

Having thus described my invention it will be obvious to those skilled in the art from the disclosure herein given that various immaterial modifications might be made in the same without departing from the spirit of my invention, hence I do not wish to be understood as limiting myself to the exact form, arrangement and combination of parts herein shown and described or used as mentioned.

I claim as my invention:

1. A filter structure for aquariums comprising a casing constructed for mounting on a side wall of an aquarium tank, a unitary filter cartridge disposed in said casing with the bottom of the cartridge spaced upwardly from the bottom of the casing, forming a chamber therebelow, said casing forming a water inlet chamber adjacent said cartridge, communicating with said first-mentioned chamber, said cartridge having a bottom inlet wall provided with openings communicating with said first-mentioned chamber, and a top outlet wall which is provided with openings therein for the passage of water therethrough, said filter cartridge containing filter material in the form of discrete particles, interposed between said inlet and outlet walls of the cartridge, a peripheral wall of said cartridge having a portion thereof, disposed above said top outlet wall adapted to form a water discharge opening, over the lower edge of which water flowing through the top wall thereof may be discharged, said casing having a water inlet communicating with said water inlet chamber, through which water from the aquarium tank is adapted to be supplied and a water outlet adapted to be aligned with the discharge opening of said filter cartridge, means forming a weir disposed above said discharge edge and extending between said water inlet chamber and said discharge opening of said cartridge over which water may flow from the inlet chamber to said discharge opening and said casing outlet in the presence of an abnormal rise in water level in said water inlet chamber, whereby filtered water, or water passing over said weir may be returned to the aquarium tank.

2. A filter structure according to claim 1, wherein said filter material comprises a mixture of pieces of carbon and pieces of expanded perlite.

3. A filter structure according to claim 1 comprising in further combination, a mass of long polyester fibers interposed between the outlet side of the cartridge and the top of said filter material.

4. A filter structure according to claim 1 wherein said weir is formed from a wall of said cartridge, and said casing is provided with means for maintaining the cartridge in operative position.

5. A filter structure according to claim 1, wherein said weir is formed by a partition wall carried by said casing.

* * * * *